US006294988B1

(12) United States Patent
Shomura

(10) Patent No.: US 6,294,988 B1
(45) **Date of Patent: *Sep. 25, 2001**

(54) ENGINE MANAGEMENT SYSTEM

(75) Inventor: Nobuyuki Shomura, Hamamatsu (JP)

(73) Assignee: Suzuki Motor Corporation, Shizuoka-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,584

(22) Filed: Feb. 11, 1999

(30) Foreign Application Priority Data

Apr. 28, 1998 (JP) ........................................ 10-118588

(51) Int. Cl.$^7$ ........................ B60Q 1/00; G01L 3/26

(52) U.S. Cl. .................... 340/438; 340/441; 73/117.2; 701/29; 701/35; 701/99; 702/187

(58) Field of Search .......................... 340/438, 439, 340/440, 459, 460–462, 525, 825.15, 825.16, 309.15, 441; 701/29, 35, 32, 30, 99, 33, 101, 115; 702/184, 187; 73/117.2, 117.3

(56) References Cited

U.S. PATENT DOCUMENTS

| | | | | |
|---|---|---|---|---|
| 5,160,926 | * | 11/1992 | Schweitzer, III | 340/538 |
| 5,329,273 | * | 7/1994 | Patton | 340/517 |
| 5,463,567 | * | 10/1995 | Boen et al. | 701/35 |
| 5,642,284 | * | 6/1997 | Parupalli et al. | 73/117.3 |
| 5,650,930 | * | 7/1997 | Hagenbuch | 701/35 |
| 5,754,964 | * | 5/1998 | Rettig et al. | 701/35 |
| 5,890,080 | * | 3/1999 | Coverdill et al. | 701/29 |
| 5,941,915 | * | 8/1999 | Federic et al. | 701/1 |
| 5,968,107 | * | 10/1999 | Vogan et al. | 701/102 |
| 6,012,004 | * | 1/2000 | Sugano et al. | 701/33 |

* cited by examiner

*Primary Examiner*—Donnie L. Crosland
(74) *Attorney, Agent, or Firm*—Darby & Darby

(57) ABSTRACT

An engine management system stores the operating time when a warning about the engine occurs, and stores the operating time when the warning is cancelled and stores various engine information at the occurrence of a warning or from the occurrence of a warning to the end of the warning.

14 Claims, 8 Drawing Sheets

FIG. 4

Warning [1] (e. g., overrev)

| | $M_1 = 1$ Memory block 1-(1) | | $M_1 = 2$ Memory block 1-(2) | | $M_1 = 3$ Memory block 1-(3) | |
|---|---|---|---|---|---|---|
| | At the time of occurence | At the time of cancellation | At the time of occurence | At the time of cancellation | At the time of occurence | At the time of cancellation |
| Operating time | | | | | | |
| Engine information 1 | | | | | | |
| Engine information 2 | | | | | | |
| ⋮ | | | | | | |
| Engine information n | | | | | | |

Warning [2] (e. g., oil pressure)

| | $M_2 = 1$ Memory block 2-(1) | | $M_2 = 2$ Memory block 2-(2) | | $M_2 = 3$ Memory block 2-(3) | |
|---|---|---|---|---|---|---|
| | At the time of occurence | At the time of cancellation | At the time of occurence | At the time of cancellation | At the time of occurence | At the time of cancellation |
| Operating time | | | | | | |
| Engine information 1 | | | | | | |
| Engine information 2 | | | | | | |
| ⋮ | | | | | | |
| Engine information n | | | | | | |

⋮

Warning [n] (e. g., over heat)

| | |
|---|---|
| | |

ENGINE MANAGEMENT SYSTEM

BACKGROUND OF THE INVENTION (1). Field of the Invention

The present invention relates to an engine management system which is suitable for appropriately and precisely performing maintenance, failure management, running-in process and other management of outboard motors, multipurpose engines, engines for jet-skis and other various engines.

(2). Description of the Prior Art

Conventional outboard motors have had a warning system of informing the user of an anomaly, mentioned below, when it occurred, by a warning buzzer, a warning lamp (LEDs, etc.) or by lowering the number of engine revolutions, so as to promote the user to manage it (the dealer's checkup, replacement of consumables, and/or supplying of oils). The examples of anomalies include, overrev, oil pressure lowering, reduction of oil (for two-cycle oil), oil flow (from clogging in the 2-cycle oil piping), overheat, battery's undervoltage, and so on.

In this conventional art, the system is adapted to promote the user to take a quick action by lowering the number of engine revolutions or any other way, but, as the product's nature of outboard motors, the engine is enabled to continue running at a low speed (high-speed running is prohibited by revolution regulation), in case of emergency (such as being drifted).

However, in some cases, continuation of operating the engine during overheat warning or oil flow warning may cause damage to the engine depending upon the degree of the overheat (degree of reduction of the amount of cooling water) and/or the time of running in the state. When an engine which was used to sail for emergency under warning conditions, not limited only to overheat or oil flow warning, needs to be checked up, or when a defective engine is checked up, if information about under what kind of warnings the engine was used and in what conditions (time, temperature, etc.) it was used to sail under the warning state is known, it is possible to perform efficient and exact maintenance of it. However, in the conventional configurations, only the alarms of warnings (by lamp indication, buzzing sound, lowering the number of engine revolutions) was provided as stated above.

An outboard motor (for jet ski, and multi-purpose engines etc.), differing from motorcycle or four-wheel vehicles (because it has no wheels), has no means for detecting absolute distance of movement. Though it has a speed meter which is operated making use of water pressure during forward movement, this speed meter produces fluctuations in measurement, depending upon the pressure detecting position, the hull shape, forward/backward movement and turning and other factors, so that it cannot measure the total distance of movement. Therefore, in general, an hour meter is used in place.

However, the information obtained from an hour meter depends upon user's utility or how the user used the vehicle. For example, use of the hour meter only gives the information of time, so the same result will be obtained when the vehicle sails for one hour at 1000 rpm and when it sails for one hour at 6000 rpm, despite the fact that the distance of movement and exhaustion and deterioration of parts and oils differ manifold.

Because of the above fact that the time measurement cannot provide exact information and because the conventional hour meter is costly and other reasons, outboard motors mostly had no hour meter and hence it was difficult to maintain them, needing high cost for exact management.

Moreover, outboard motors, from their product's nature, are driven continuously under high load at high number of engine revolutions, more frequently compared to the engines for two or four-wheel vehicles having a transmission device. Despite such use conditions, it was difficult to grasp the exact time, exact distance of sailing and perform exact maintenance from the reasons described above, so that it was impossible to manage and perform the running-in process in a good enough manner.

SUMMARY OF THE INVENTION

The present invention has been devised in order to eliminate the above problems and it is therefore an object of the invention to provide an engine management system which can manage an engine by grasping exact running states such as warnings, sailing distance, running-in management and the like.

In order to achieve the above object, the present invention is configured as follows:

In accordance with the first aspect of the invention, an engine management system, comprises:

- a warning occurrence information storing means for storing the operating time when a warning about the engine occurs; and
- a warning cancellation information storing means for storing the operating time when the warning is cancelled In accordance with the second aspect of the invention, an engine management system, comprises:

- an engine information storing means for storing various pieces of engine information at the occurrence of a warning or from the occurrence of a warning to the end of the warning.

In accordance with the third aspect of the invention, an engine management system, comprises:

- a warning occurrence information storing means for storing the operating time when a warning about the engine occurs;
- a warning cancellation information storing means for storing the operating time when the warning is cancelled; and,
- an engine information storing means for storing various pieces of engine information at the occurrence of a warning or from the occurrence of a warning to the end of the warning.

In accordance with the fourth aspect of the invention, an engine management system comprises:

- an occurrence frequency storing means for storing the numbers of occurrences of various warnings.

In accordance with the fifth aspect of the invention, the engine management system having any one of the above first to fourth feature, further comprises a means for transferring the various stored information to a display device by a communication network, wherein the stored pieces of information can be displayed on the display device.

In accordance with the sixth aspect of the invention, an engine management system comprises:

- a means for storing the operating time classified according to number of engine revolutions and/or engine load, and is characterized in that the engine is managed based on the stored time.

In accordance with the seventh aspect of the invention, an engine management system comprises:

a storing means whereby the operating time to be stored is given a weight according to the predetermined running condition of the engine, and the operating time is summed up separately based on the number of engine revolutions and based on the engine load so that the summations are stored, and is characterized in that when the stored operating time reaches a set value, the corresponding management item is indicated.

In accordance with the eighth aspect of the invention, the engine management system having the above seventh feature is characterized in that when either the time obtained by giving weights to the operating time classified according to number of engine revolutions and engine load, or the engine's operating time, first reaches the set value, the predetermined management item is indicated.

In accordance with the ninth aspect of the invention, the engine management system having the above seventh or eighth feature is characterized in that concerning management items of which the interval for maintenance or replacement varies depending upon the total operating time, the set value is switched based on the total operating time.

In accordance with the tenth aspect of the invention, an engine management system, comprises:

a means wherein upper limits of the recommended number of engine revolutions or upper limits of the recommended load are preset for the running-in process based on the total operating time, or based on a distance-related value and whereby the number of engine revolutions or load is judged to exceed the upper limit; and a means for performing the predetermined indication when the upper limit is exceeded.

In accordance with the eleventh aspect of the invention, the engine management system having the above tenth feature, further comprises a control means for lowering the number of engine revolutions when the engine continues to be run for more than a certain period of time with the speed or load exceeding the predetermined value.

In accordance with the twelfth aspect of the invention, the engine management system having the above eleventh feature is characterized in that when the engine has continued to run at an number of engine revolutions lower than the predetermined rate for canceling the number of engine revolutions lowering control, to thereby meet the predetermined condition, the number of engine revolutions lowering control is cancelled.

In accordance with the first feature of the invention, since the operating time when a warning about the engine occurred and the operating time when the warning was cancelled are stored in memory, it is possible to estimate the user's action and the duration of the warning from the time of occurrence of the warning and the time of the end of the warning. Accordingly, the judgment of the presence of damage to the engine can be made easily and the handling (repair, replacement, etc.) can be simplified.

In accordance with the second feature of the invention, since the various pieces of information about the engine are stored at the occurrence of a warning or from the occurrence of a warning to the end of the warning, from the diverse information about the engine during the occurrence of a warning, the judgment of the presence of damage to the engine can be made easily and the handling (repair, replacement, etc.) can be simplified.

In accordance with the third feature of the invention, since the operating time when a warning about the engine occurred, the operating time when the warning is cancelled, and the various pieces of information about the engine at the occurrence of the warning or from the occurrence of the warning to the end of the warning are stored in memory, it is possible to estimate the user's action and the duration of the warning from the time of occurrence of the warning and the time of the end of the warning. Further, from the diverse information about the engine during the occurrence of a warning, the judgment of the presence of damage to the engine and the handling (repair, replacement, etc.) can be improved.

In accordance with the fourth feature of the invention, since the numbers of occurrences of various warnings are stored in memory, it is possible to offer advice about the way of manipulating the boat, propeller matching, maintenance etc., if the engine has had certain kinds of warnings many times.

In accordance with the fifth feature of the invention, since various information can be transferred to a display device through communication network so that the stored pieces of information can be displayed on the display device, this configuration provides for simplifying the layout of the management unit and the display device, in addition to the operation and effectiveness of the above first through fourth features.

In accordance with the sixth feature of the invention, since the system has a means for storing the operating time classified according to number of engine revolutions and/or engine load, and manages the engine based on the stored time, the timing of maintenance and replacement of consumable parts, which were difficult to manage can be known and hence can be performed easily and without any cost.

In accordance with the seventh feature of the invention, the system includes a storing means whereby the operating time to be stored is given a weight according to the predetermined running condition of the engine, and the operating time is summed up separately based on the number of engine revolutions and based on the engine load so that the summations are stored. In this system, when the stored operating time reaches a set value, the corresponding management item (such as the timing of maintenance, the timing of replacement of consumable and/or degraded parts) is indicated (by lighting of a lamp, buzzer sound, LCD display etc.). Thus, since the exhaustion and degradation not only depends on the time of operation but also depends on the number of engine revolutions, load and temperature, this configuration of giving weights enhance the precision of the timing of replacement.

In accordance with the eighth feature of the invention, when either the time obtained by giving weights to the operating time classified according to number of engine revolutions and engine load, or the engine's use time (including the time of being left other than the operating time), first reaches the set value, the predetermined management item (the timing of replacement) is indicated. Thus, the timing of replacement can be changed taking into account not only the operating time but also the time of being left. As a result, this configuration provides enhancement of the precision of the timing of replacement in addition to the above operation and effects of the seventh configuration.

In accordance with the ninth feature of the invention, concerning management items of which the interval for maintenance or replacement varies depending upon the total operating time, the set value is switched based on the total operating time. Accordingly, it is possible to vary the timing of replacement of items, of which the interval for replacement varies, such as engine oil etc., based on the total operating time. Because, for example, engine oil needs to be changed after a shorter interval, for the first time. Thus, this configuration provides the above effect in addition to the above operation and effects of the seventh or eighth configuration.

In accordance with the tenth feature of the invention, the system, includes: a means wherein upper limits of the recommended number of engine revolutions or upper limits of the recommended load are preset for the running-in process based on the total operating time, or based on a distance-related value and whereby the number of engine revolutions or load is judged to exceed the upper limit; and a means for performing the predetermined indication (with a lamp or buzzer) when the upper limit is exceeded. As a result, the running-in process of the engine, which was difficult to manage, can be simply and exactly effected without any cost, thus making it possible to improve the durability of the product.

In accordance with the eleventh feature of the invention, the system having the above tenth feature, further includes a control means for lowering the number of engine revolutions when the engine continues to be run for more than a certain period of time with the speed or load exceeding the predetermined value. Therefore, in addition to the action and effect of the above tenth configuration, this control means can gradually lower the number of engine revolutions by performing the ignition cutting, controlling the phase lag and/or injection.

In accordance with the twelfth feature of the invention, in the system having the above eleventh, when the engine has continued to run at an number of engine revolutions lower than the predetermined rate for canceling the number of engine revolutions lowering control, to thereby meet the predetermined condition, for example, when the engine is has been run for a time longer the set time, the system judges that the operator has recognized the running-in process and returned the throttle, and cancels the number of engine revolutions lowering control.

BRIEF DESCRIPTION OF THE DRAWINGS

FIG. 4 is an illustrative diagram showing data storage in embodiment 1;

DESCRIPTION OF THE PREFERRED EMBODIMENTS

The embodiments of the invention will hereinafter be described in detail with reference to the accompanying drawings.

Figure 1:
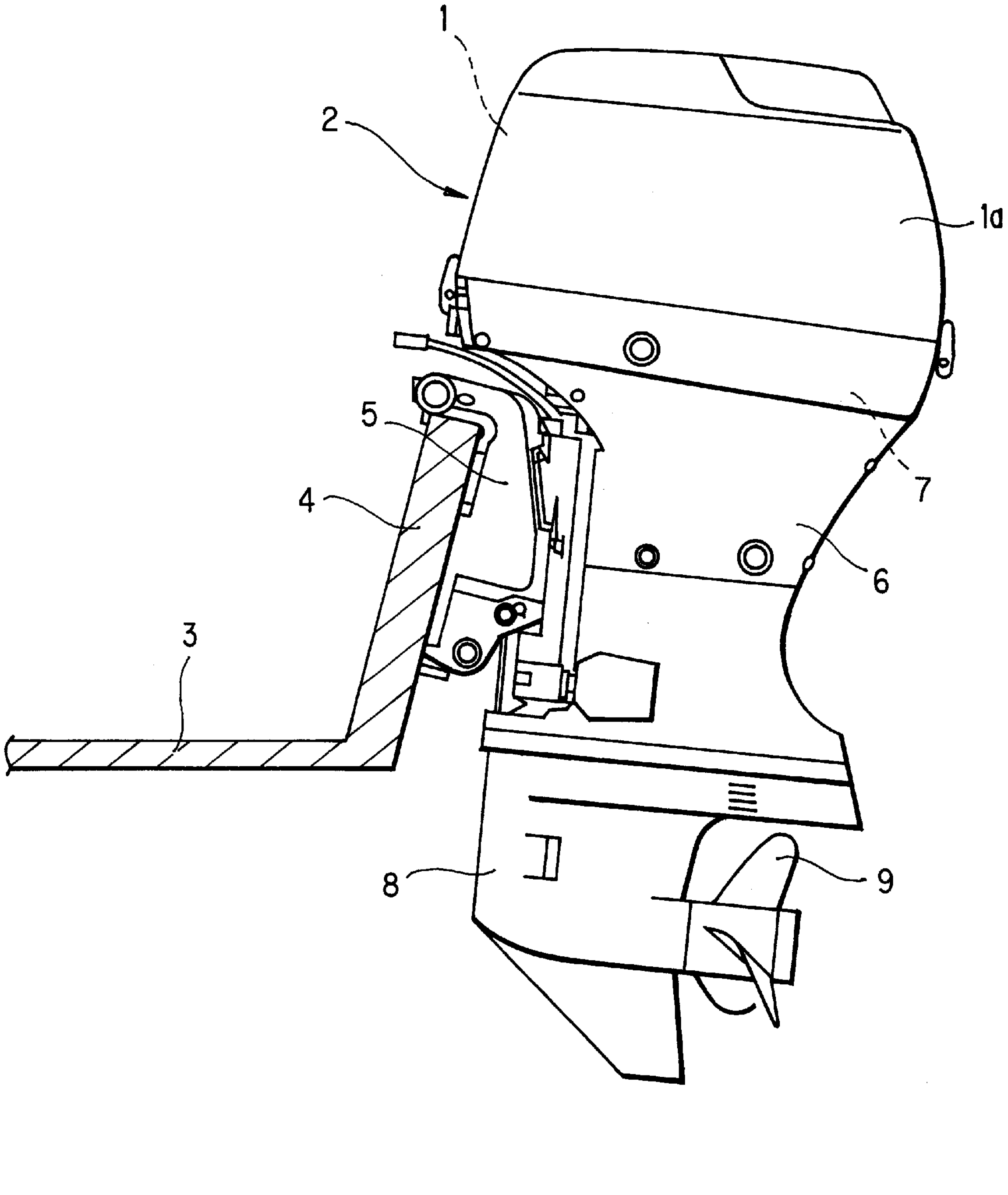
FIG. 1 is an illustrative view showing an engine of the embodiment in accordance with the invention.
Figure 2:
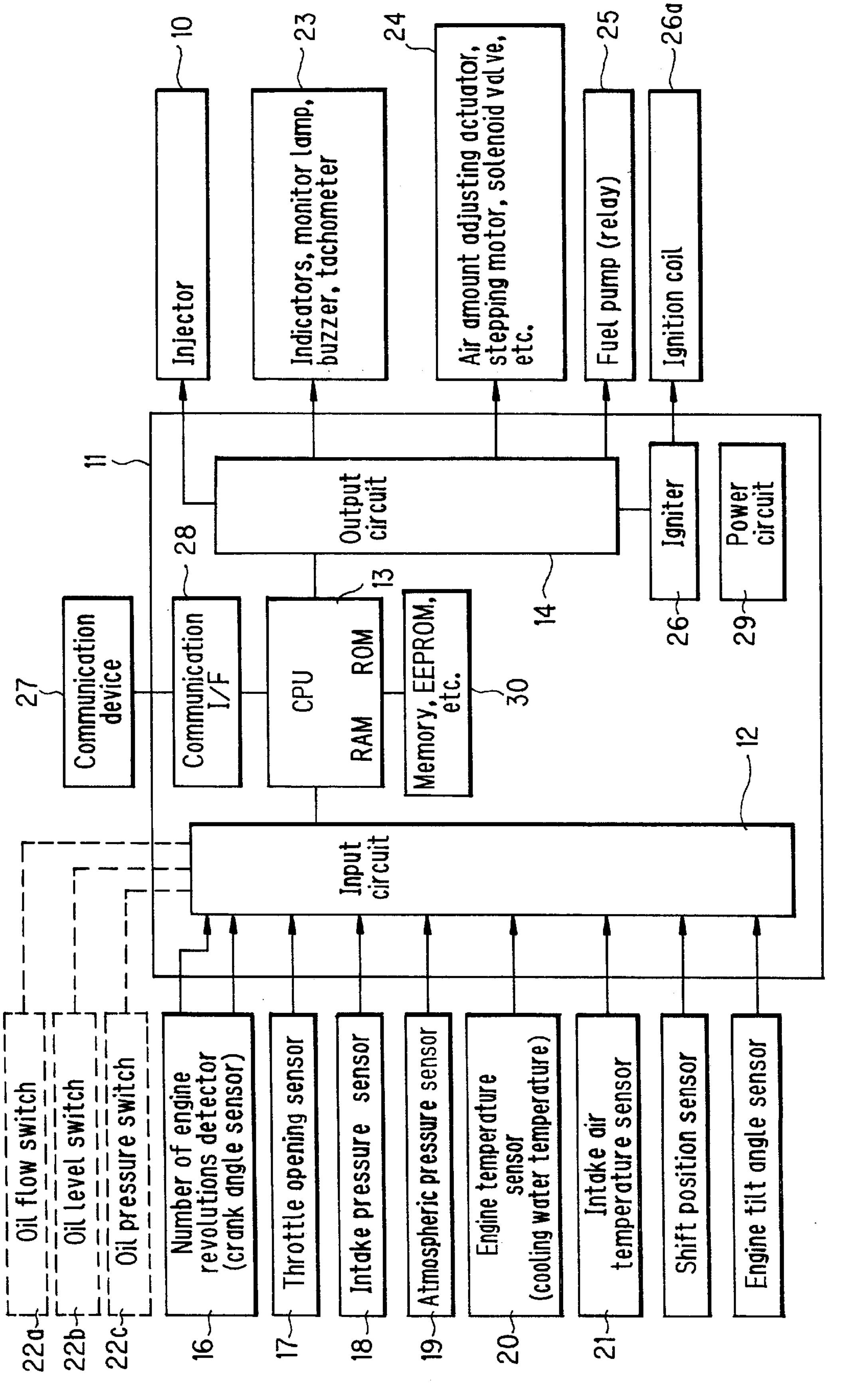
FIG. 2 is a block diagram of the control system of an engine of the embodiment.

FIG. 1 is an illustrative view showing an outboard motor 2 having an electronically controlled fuel injection type engine (internal-combustion engine) 1 in accordance with the embodiment. FIG. 2 is a block diagram showing the control system of the engine 1.

As shown in FIG. 1, outboard motor 2 is mounted to a transom beam 4 of a hull 3 by means of a bracket 5. Outboard motor 2 has a drive shaft housing 6 which extends vertically in the rear of bracket 5 and is of a hollow body overally having a horizontal section of a fusiform. Formed over drive shaft housing 6 is an engine holder 7, on which engine 1 lidded with a cover la is mounted. A gear casing 8 is linked under drive shaft housing 6. This gear case 8 rotatably supports a propeller shaft having a propeller 9 directed horizontally to the rear.

The engine control system in accordance with this embodiment uses an electronically controlled fuel injection system, and the engine management system is also configured of sensors, an electronic control unit 11, indicators, etc.

As shown in FIG. 2, in order to control fuel injection and perform engine management, the rotational speed of engine 1 (crank angle sensor 16), the degree of the throttle valve opening (throttle valve opening sensor 17), the intake pressure inside the surge tank (intake pressure sensor 18), the atmospheric pressure (atmospheric pressure sensor 19), the engine temperature (cooling water temperature sensor 20), and the intake temperature (intake temperature sensor 21) are detected by corresponding sensors so that the detected results are input to control unit 11 through an input circuit 12. If engine 1 is a two-cycle engine, signals from an oil flow switch **22*a* and from an oil level switch 22*b* are supplied to control unit 11. If engine 1 is of a four-cycle type, a signal from oil pressure switch 22*c* is input into control unit 11**.

In control unit 11, a CPU (central processing unit) 13 including a microcomputer, RAM and ROM, calculates the intake amount based on the data, and performs additional compensations for the intake amount, thereafter calculates the optimal injected amount of fuel, which is in turn output to a fuel injector 10 via an output circuit 14. Fuel injector 10 injects an optimal amount of fuel corresponding to the intake amount by duty control.

Control unit 11, in addition to the above fuel injection control, performs warning detection, storage of the operating time and control of the running-in process. Other outputs from control unit 11 are supplied to indicators 23 such as monitor lamps, buzzer, tachometer etc., an air amount adjusting actuators 24 such as stepping motors, solenoid valves etc., a fuel pump relay 25, and an ignition device 26 including an ignition coil **26*a***, etc.

Control unit 11 also has a communication interface 28 through which signals such as operating instructions etc., are transferred via a transceiver 27 from the helm arranged in front of the operator, and thereby the signals are input into CPU 13. Power from the battery and/or the magneto is supplied to a power circuit 29.

Control unit 11, in addition to ROM (read only memory) and RAM (random access memory) for storing the programs to be effected by CPU 13 and the determined data, may have a memory 30 which stores data without being affected by the battery power source. This memory 30 may be a storage capable of retaining data by virtue of a backup power source after removable of the power source. The examples of such memory include an EEPROM (electrically erasable programmable ROM) which may have the program content erased and new information implanted therein and can retain data during the power being off.

Now, overall scheme of the control of the engine management system in accordance with embodiment 1 will be described.

1) The system stores the operating time at the occurrence of a warning and the operating time at the cancellation of the warning.

2) The system stores a variety of information about the engine (number of engine revolutions, degree of the throttle opening, boost pressure, wall temperature, intake temperature, atmospheric pressure, etc.) from the occurrence of a warning to the end of the warning.

3) The system overwrites the information concerning 1) and 2) so that the latest, multiple number of data, depending upon the storage capacity, of warnings can always be stored. The system also changes the storing interval (sampling time) of the diverse information of 2) depending upon the storage capacity.

4) The system stores the number of occurrences of warnings.

The above stored contents can be displayed on the service tool (personal computer etc.) through communication network when the engine failure is repaired at the checkup site such as automobile dealer etc., whereby it is to provide the following effects and advantages.

Actually, from the operating time at the occurrence of a warning and the cancellation of the warning, the duration of the warning can be known so that it is possible to determine whether the user took a quick action to the warning or continued to run the engine at a low speed without taking any action. Further, since the sites in the engine which might possibly be damaged can be located from the types of warnings and the engine information recorded during the running of the engine, it is possible to offer advice about the user's action (written in the user's manual etc.,) upon the warning or whether the user's action was proper or not, as well as to facilitate early detection and replacement of consumable and/or degraded parts.

As a practical example, if a warning of overheat occurred when the total operating time was at 30 hrs. 12 min., and was canceled at 30 hrs. 14 min., the record can be understood as a temporal (about two minutes in this case) cooling performance degradation (due to air suction by excessive rise of the PTT (Power Trim and Tilt), due to temporal clogging of the water inlet port with a polyvinyl film or other object or due to other reasons), or as that the user took a proper action upon the warning.

In the case where a warning of overheat occurs at 500 hrs. 12 min. and is cancelled at 501 hrs. 32 min., this situation indicates that the engine was operated at a low speed for a long time (about 1.5 hours in this case). Therefore, it is highly probable that the engine has been damaged. In addition, in view of the occurrence of the warning after a long use, this situation should be recognized such that clogging of the cooling water path with salt etc., degradation of water pump, thermostat, piston, cylinder, harness and other parts, should be checked for replacement. Moreover, since the diverse pieces of information about the engine have been stored from the occurrence of the warning to the end of it, it is also possible to predict whether the engine has been damaged, from the highest wall temperature and the number of engine revolutions during the above 1.5 hours.

The dealer can offer advice to the user about the usage and maintenance, based on the types of warnings with their numbers of occurrence. For example, if an engine is found to have had many overrev, it is possible for the dealer to advise the user about whether a proper propeller is selected and/or whether the engine is operated in a right manner (about the way of raising the PTT and other operation).

If the engine is found to have had an increased number of over-warnings, it is determined that there is a chance of degradation of the cooling system performance, so that checkup as well as replacement of consumable and degraded parts can be performed.

Other than the above, upon troubles such as engine burn etc., it is possible to confirm that the engine has been unoperated for a long period of time after a warning of oil level, oil pressure and/or overheat and hence offer a proper advice based on the aforementioned diverse pieces of data.

Figure 3:
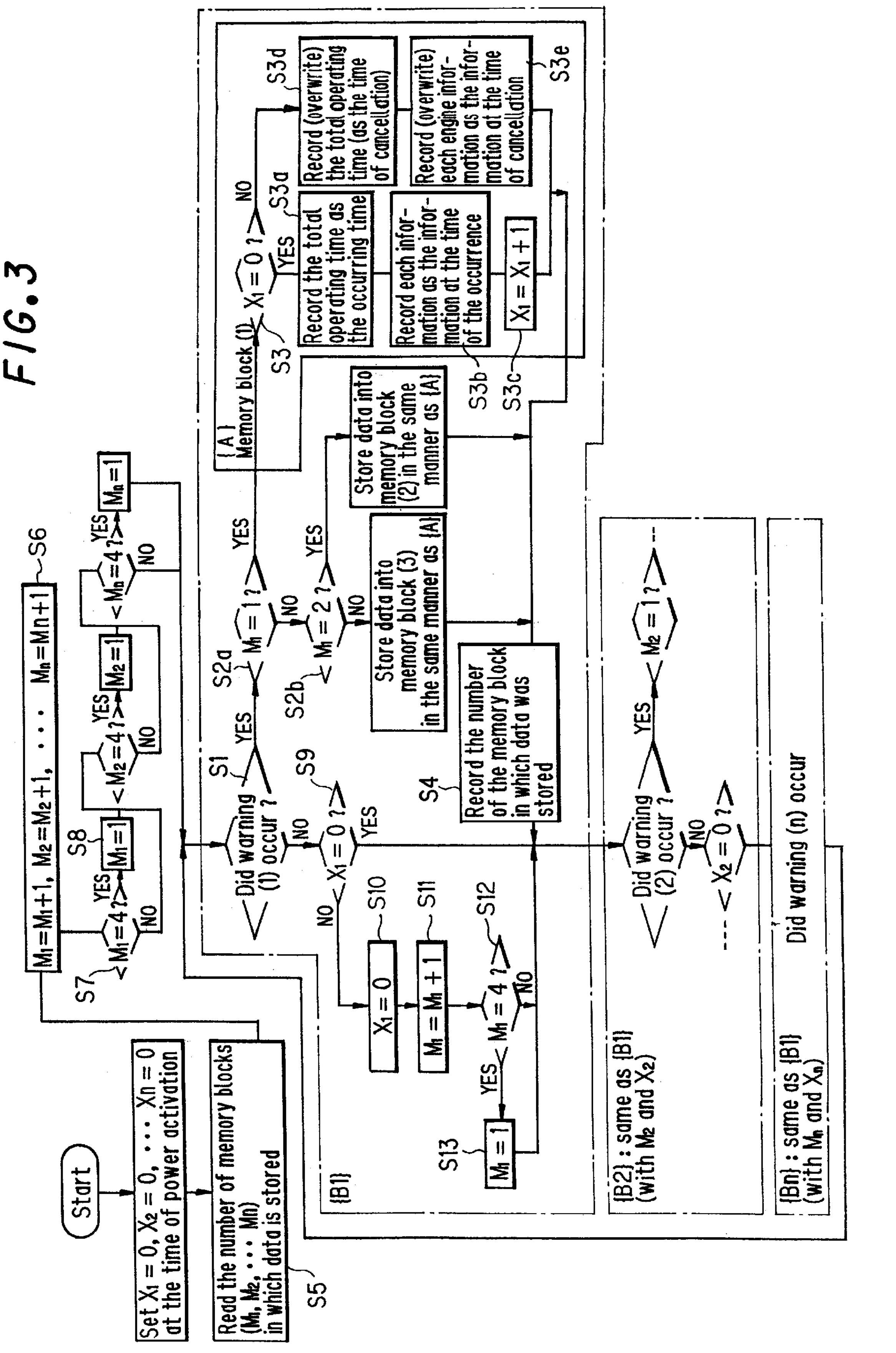
FIG. 3 is a flowchart for illustrating the control of embodiment 1.

Next, FIG. 3 shows a control flowchart for a specific warning management of embodiment 1 and FIG. 4 shows an example of information storage scheme.

As shown in FIG. 4, warnings [1] to [n] correspond to overrev, oil pressure, oil level, oil flow, battery undervoltage, overheat and the like, respectively. Variables x1 to xn, M1 to Mn are defined as follows:

'x1 to xn' correspond to warnings [1] to [n] and take a value of 0 (xi=0 (i=1, . . . , n) before the corresponding event occurs and a value of 1 (xi=1) during the event is occurring.

M1 to Mn correspond to memory blocks for storing warning information. There are a plural number of (for example, three) memory blocks for storing each kind of information, and the information of each warning is stored or overwritten into the cell in the next block when the warning is cancelled, so that the latest plural number of data can remain. In preparation for a sudden shutdown of the power source, whenever each warning is stored, the memory block is stored into the aforementioned memory 30 (see FIG. 2) which is able to keep the data even after the deactivation of the power source.

As shown in the flowchart in FIG. 3, in the warning management of embodiment 1, when the power is activated, x1 to xn are initialized (x1=0, x2=0, . . . , xn=0) so as that no warning is given.

The process of storing the information of warnings such as time of the occurrence and cancellation of each of warnings [0] through [n] is effected, following the flow (partial flow) within each of the regions {B1} to {Bn} in FIG. 3.

In the determining process of the partial flow {B1}, it is determined whether warning [1] (of, for example, overrev) is occurring (Step (S) 1).

If warning [1] is occurring (S1:yes), it is checked which memory block, M1, M2 or M3, the data is to be written in (S2*a*, S2*b*).

If the data should be written into memory block M1 (S2*a*: yes), the partial flow process {A} in the flowchart of FIG. 3 is effected. On the other hand, if the data should not be written into memory block M1 but should be written into memory block M2 (S2*b*:yes), or should be written into memory block M3 (S2*b*:no), the same process as in {A} is performed and the data is stored into memory block M2 or M3, respectively.

Here, in the partial flow {A}, it is checked first whether x1 is equal to 0 (x1=0) (S3).

If x1=0 and a warning occurs (S3:yes), each piece of information is written into the cell at the time of occurrence in FIG. 4. Specifically, the total operating time is stored as the time of occurrence (S3*a*), and each piece of engine information is stored as the information at the time of occurrence (S3*b*), and then x1 is incremented by 1 (x1=x1 +1) (S3*c*).

On the other hand, if S3=no, x=1, which means that a warning is occurring (that is, the warning once occurred has not been cancelled yet), so that the total operating time is stored (overwritten as the time of cancellation) (S3*d*). Then the engine information is stored (overwritten as the information at the time of cancellation) (S3*e*). This storing is repeated or updated (overwritten) until the warning is cancelled so that the latest information can be stored.

Accordingly, since the latest information is overwritten and stored until the warning is cancelled, the latest information data will remain as the data at the time of cancellation even if the power is abruptly shut down. Here, the deactivation of the power is determined as the cancellation.

Next, the memory block number at which the data was stored is stored into the memory (S4).

Since the memory block number is stored at S4 even if an abrupt power shutdown occurs, x1 to xn will be set into the cancelled state (x1 to xn=0) when the power is activated next. Every time the operation is started, the memory number is loaded (S5) so that the memory locations in the memory block next to the loaded memory block are set to be accessible for storage (S6). Here, in this embodiment, since three memory blocks for each warning are provided, the data is stored into block M1 after the storage into block M3 (S7). That is, the memory block is switched in the sequential order of 1->2->3->1.

On the other hand, if the judgment is negative at S1, it is judged whether x1 is equal to 0 (x1=0) (S9). When x1=1 (S9:no), this indicates that the warning had occurred up to the previous judgment and is cancelled at this time. In this case, x1 is initialized so that x1=0 (S10), and M1 is incremented by 1 (M1=M1+1) so that the memory block number is varied (S11 to S13). That is, the memory block is switched in the sequential order of 1->2->3->1.

Accordingly, until the warning is canceled, the data is overwritten into the same memory block.

The above description is made as to the process for warning [1], after the partial flow {B1} is finished, a similar partial flow {B2} of the process of storing the information as to occurrence and cancellation of warning [2] is effected in the same manner as the processing of the above partial flow {B1}. When this process is completed, the process for warning [3] is effected by the partial flow {B3}. In this way, a similar flow is effected for each warning [1] to [n] while variables xn and Mn are varied.

Thus, as shown in FIG. 4, the warning information at the latest, the second to the last and the third to last can remain for each warning.

Next, embodiment 2 will be described.

In this embodiment 2, the operating time is stored so as to inform the user or others of the timing of maintenance and the timing of replacement of consumable and degraded elements.

Differing from the two-wheel and four-wheel vehicles, an outboard motor has no wheel, and hence has no way to detect the absolute distance of movement. Though it has a speed meter which is operated making use of water pressure during movement, this speed meter produces fluctuations in measurement, depending upon the pressure detecting position, the hull shape, forward/backward movement and turning and other factors, so that it cannot measure the total distance of movement. Therefore, in general, an hour meter is used in place. This hour meter typically computes the sum of the time during which the main power source (the ignition switch) is turned on, and sums the time when the hour meter is energized even if engine 1 produces no rotation.

In contrast to this, embodiment 2 of the invention computes the total operating time in the following manner:

(1) The system computes the sum of the time during which engine 1 runs. The system is one shown in FIG. 3. In this case, time is summed up when the signal is input from the number of engine revolutions detector (during running).

(2) In parallel, the sum of time classified according to the engine's speed during running is recorded.

For example, the time is classified, according to number of engine revolutions, at 0 to 1000 (rpm), at 1000 to 2000 (rpm), at 2000 to 3000 (rpm), at 3000 to 4000 (rpm), at 4000 to 5000 (rpm), at 5000 to 6000 (rpm), and at 6000 (rpm) or above.

(3) The time of operation is classified and stored according to the engine's number of engine revolutions and the engine's load. The load on the engine is calibrated based on the degree of the throttle opening, the boost, etc., with relation to the number of engine revolutions. Stored example of the time of operation is shown in Table 1.

TABLE 1

| | | Number of engine revolutions | | | | | | |
|---|---|---|---|---|---|---|---|---|
| | | 0– 0–1000 | 1000– 2000 | 2000– 3000 | 3000– 4000 | 4000– 5000 | 5000– 6000 | 6000- |
| Throttle opening | 0–20% | | | | | | | |
| Opening | 20–40% | | | | | | | |
| | 40–60% | | | | | | | |
| | 60–80% | | | | | | | |
| | 80–100% | | | | | | | |

(4) The operating time is summed and stored. When the total time has reached the set time of maintenance or the set time of replacement of consumable and degraded parts, this will be indicated by lighting of a lamp (LPD), buzzer sound and/or on a display device (LCD etc.).

(5) For some maintenance items, consumable and degraded parts, judgement from only the operating time is not enough good, so that the operating time is calibrated by giving a weight to respective operating time (by multiplying a coefficient) based on the number of engine revolutions, load (the degree of throttle opening, boost) and/or operated temperature. When the thus calibrated time has reached the set time, the item will be displayed.

(6) In addition to (5) above, for the items which will degrade not only from running but also from being left, the passage of time in addition to the operating time also needs to be considered for the time calibration. When either of the two has first reached the set time, the item related should be displayed.

(7) When the interval for maintenance and the interval for replacement change depending upon the total operating time, the set value is varied depending upon the operating time.

Figure 5:
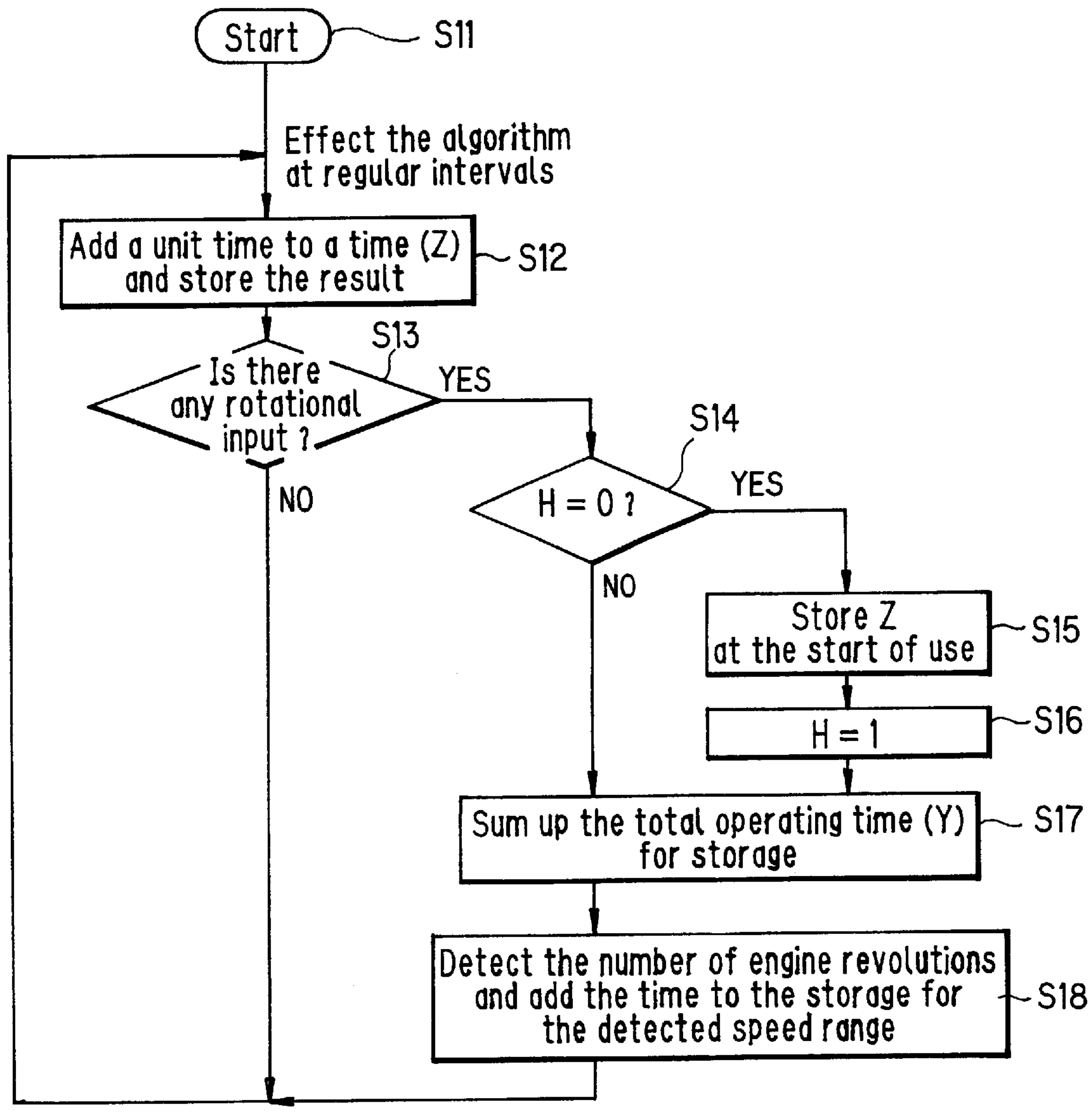
FIG. 5 is a flowchart for illustrating the running time accumulation control in accordance with embodiment 2.
Figure 6:
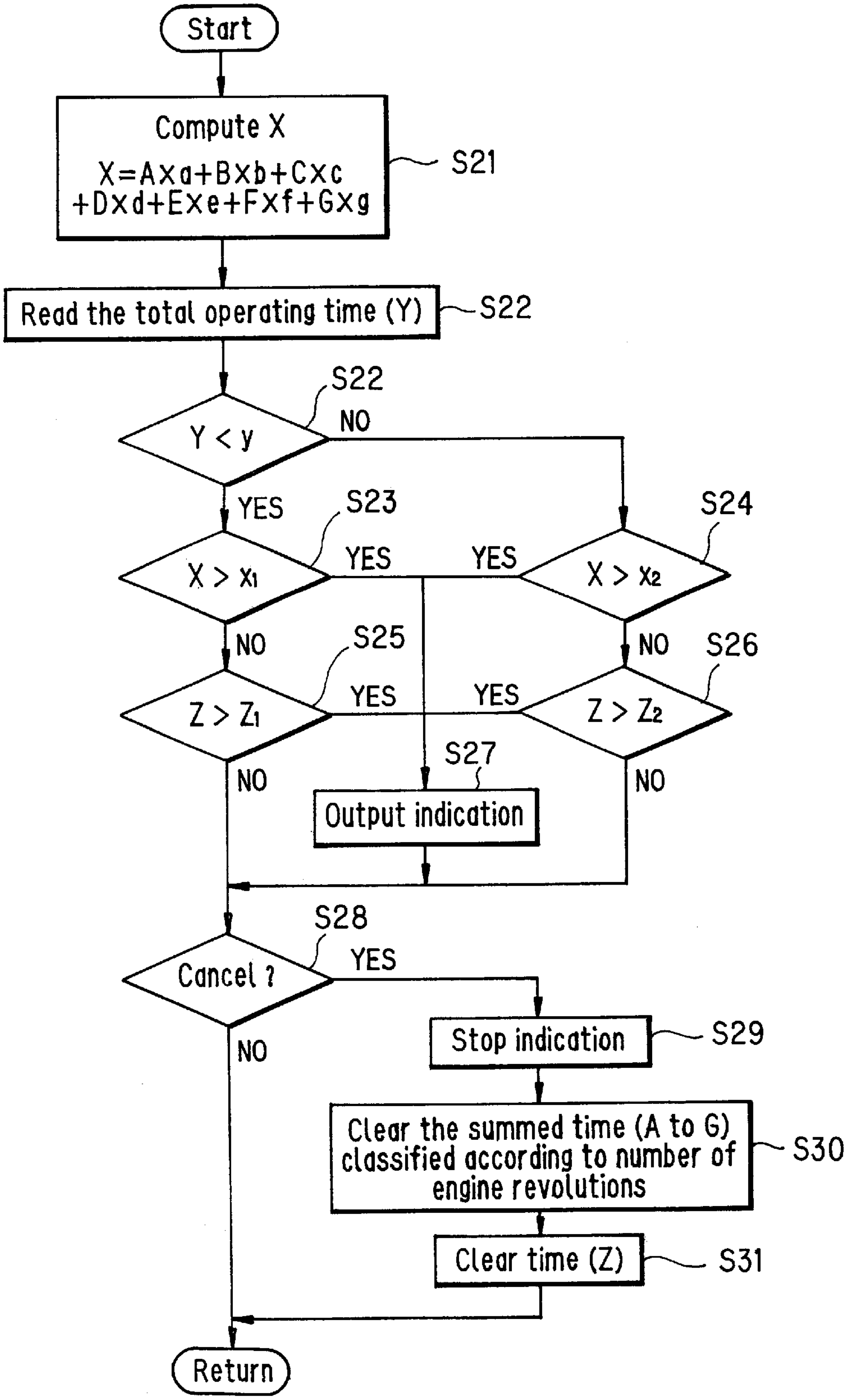
FIG. 6 is a flowchart for illustrating the control of weighted summed time in accordance with embodiment 2.

Next an example of the engine management system in accordance with embodiment 2 will be described with reference to the application to indication of the timing of oil changing. FIGS. 5 and 6 shows the operation flow of this engine management.

In this case, as shown in Table 2 below, the summed time (A to G) for each range of number of engine revolutions is multiplied by a weighting coefficient (which is previously determined), and the weighted time is summed up to compute a summation X.

TABLE 2

| Number of engine revolutions range | Summed time | Coefficient | |
|---|---|---|---|
| 0–1000 (rpm) | A | a | Axa |
| 1000–2000 | B | b | Bxb |
| 2000–3000 | C | c | Cxc |
| 3000–4000 | D | d | Dxd |
| 4000–5000 | E | e | Exe |
| 5000–6000 | F | f | Fxf |
| 6000– | G | g | Gxg |
| Total | | | X |

In this embodiment 2, when the above summation X reaches the set value or more, the user is informed of the timing of the engine oil to be changed, by lighting an oil change sign or displaying it on a liquid crystal display (in a stepwise manner). When the user recognizes the indication and performs the canceling operation and/or replacement, the system detects the completion of this process and clears the display and storage and restart summing the time for the next indication about the timing for changing oil. Since the degradation of the oil, even with the same total operating time, varies depending upon the frequency of use, load, use temperature and use time, the timing of oil changing is indicated also taking into account the following (a) to (c). This configuration allows the user to manage oil changing without memorizing the previous time of changing oil, in a more reliable and exact manner compared to the conventional configuration.

(a) Giving weights based on the used number of engine revolutions range.

(b) The interval for the first oil changing is set shorter.

(c) Taking into account the degradation from a prolonged time of being left, the display of oil changing is indicated by selecting the earlier one from the operating time and the time of being left.

It should be noted that the indication of the oil changing timing does not need to be made at short intervals so that the indication can be made during the low speed mode, or during the CPU operating time such as when the main power is turned on.

Next, the operation flows will be described.

As shown in the flowchart in FIG. 5, computation of the total time for each number of engine revolutions range is commenced after the activation of the power source such as battery (S11). In this case, a variable H is initialized at zero (H=0).

For storing the time after the power activation, a unit time is added to time 'Z' at regular intervals (S12). Then, based on the presence or absence of the input from the number of engine revolutions detector, it is determined whether there is a rotational input (from the engine's running) (S13). If there is no rotational input, the engine remains unoperated so that the operation returns to S12.

On the other hand, if the engine is operated (there is a rotational input) (S13:yes), it is judged whether H is equal to 0, that is, whether the operation is at starting stage (S14). If the engine has is just started operating, the time 'Z' when the operation is started is stored at the beginning (S15), and variable H is set into 1 (S16). That is, the use starting time after shipment (start) is recorded.

When the engine is in operation (S13:yes) and when the engine has been already started at that time (S14:no), the total operating time (Y) is summed up and the sum is stored (S17). Then the number of engine revolutions is detected and the time is added up for each detected number of engine revolutions range (computing the summed time A to G for each number of engine revolutions range (see Table 2)), and the results are stored (S18). Then the operation returns to S12.

The indication of the timing of oil changing is performed following the flowchart shown in FIG. 6. That is, the summed operating time A to G computed for each number of engine revolutions range in accordance with the flowchart shown in FIG. 5, is given a weight according to Table 2 above, and the thus weighted values are summed up to compute a total X (S21). For example, X=A×a+B×b+C×c+ . . . G×g is computed.

Next, by reading the total operating time (Y), it is determined whether this total operating time (Y) has reached the set time y. Based on this result, the set value for oil changing is altered (S22). That is, if the total operating time (Y) has not reached the set time y, the set values x1 and z1 are used (S23 and S25). If the total operating time has reached, the set values x2 and z2 are used (S24 and S26).

When the total X reaches x1 or x2 (S23 or S24:yes), an indication of oil changing is output (S27). Even if the total X has not reached x1 or x2, the time Z reaches z1 or z2 (S24 or S26:yes), an indication of oil changing is output (S27). This indication is performed by means of a symbol mark lamp, liquid crystal display or the like.

Subsequently, after the output of the indication, the user recognizes the timing for changing oil and performs the canceling operation (for example, turn the cancellation switch on) (S28:yes), the indication output is stopped and the summed time A to G for each number of engine revolutions range and time Z are cleared (S28 to S31). If these values need to be used for other control, they can be stored in another memory.

If the cancellation has not been done, the indication continues to be output (S28:no).

The indication for the oil changing timing does not need to be done at short intervals, so that the indication can be made during the low speed mode, or during the CPU operating time such as when the main power is turned on.

In the above embodiment 2, a specific example of indication of the engine oil changing timing was described. Other than this, supply or replacement of various elements such as gear oil, engine oil filter, water pump impeller, etc., can be indicated in a similar manner.

Next, embodiment 3 will be described.

This embodiment 3 is to indicate and manage the running-in process, making use of the memory of the total operating time.

As stated above, an outboard motor has no total distance meter, so that it needs a record of the use time for achieving a proper running-in process. Further, in general, an outboard motor is used with the throttle opened to a high degree (or in a high load range), more often compared to the two-wheel and four-wheel vehicles. Therefore, the outboard motor is liable to be run erroneously in a high load range without making any running-in process. On the other hand, the engine of two-wheel or four-wheel vehicle has a transmission device. So, if it is run in a high load range, the speed of the vehicle becomes higher than required, so that there is little chance that the engine is continued to be run in the high load range.

Figure 7:
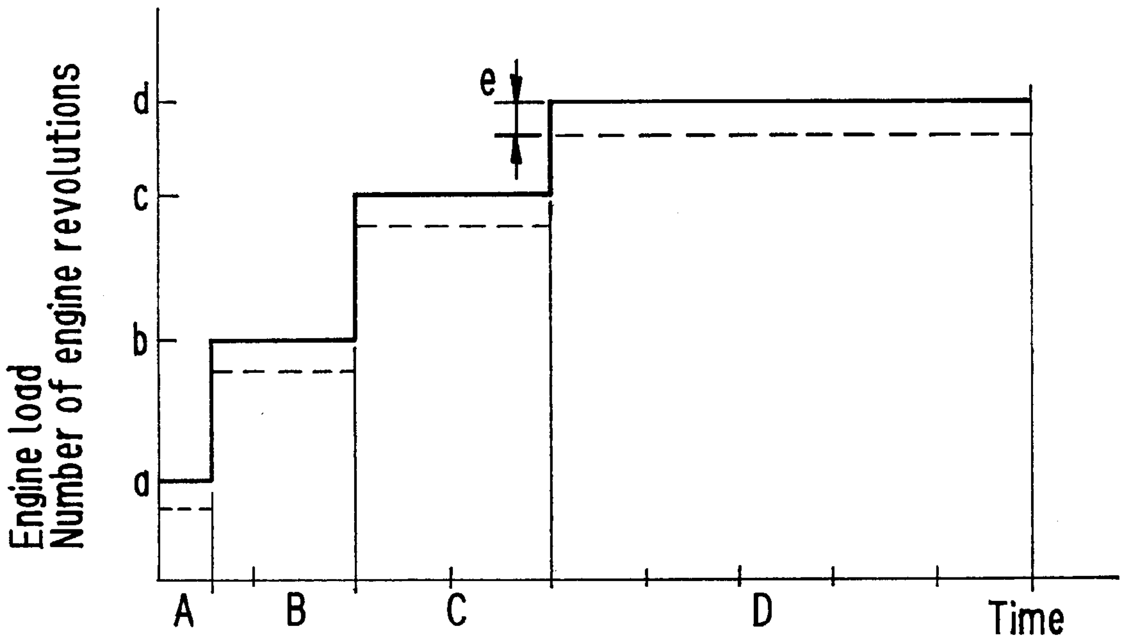
FIG. 7 is a chart for illustrating the control during the running-in process.

As shown in FIG. 7, depending upon the running time (A to D) from the start of use of the engine, the upper limit of the recommended number of engine revolutions and the upper limit of the recommended engine load (substituted by or calibrated from the degree of the throttle opening, boost pressure, air amount, or the like) are set, and if the engine is run exceeding the predetermined value, an indicator (lamp, LCD etc.) and/or buzzer is used for warning. Alternatively, if the engine continues to run exceeding the set value for a time longer than the set period of time, the ignition and injection are controlled so as to gradually lower the number of engine revolutions to thereby promote the user running-in process.

Further, when the number of engine revolutions is gradually decreased so as to remind the user of the running-in process and the user recognizes the running-in process and returns the throttle so that the engine continues to run at a lower speed than the set value without the necessity of the speed lowering control (ignition cutting, phase lag, injection cutting, etc.), the speed lowering control will be cancelled. This configuration is to prevent engine's inability to avoid emergency due to the running-in process. In this case, however, if the engine of the boat continues to be driven for sailing exceeding the set value for a certain time, the speed lowering control will be performed again.

Figure 8:
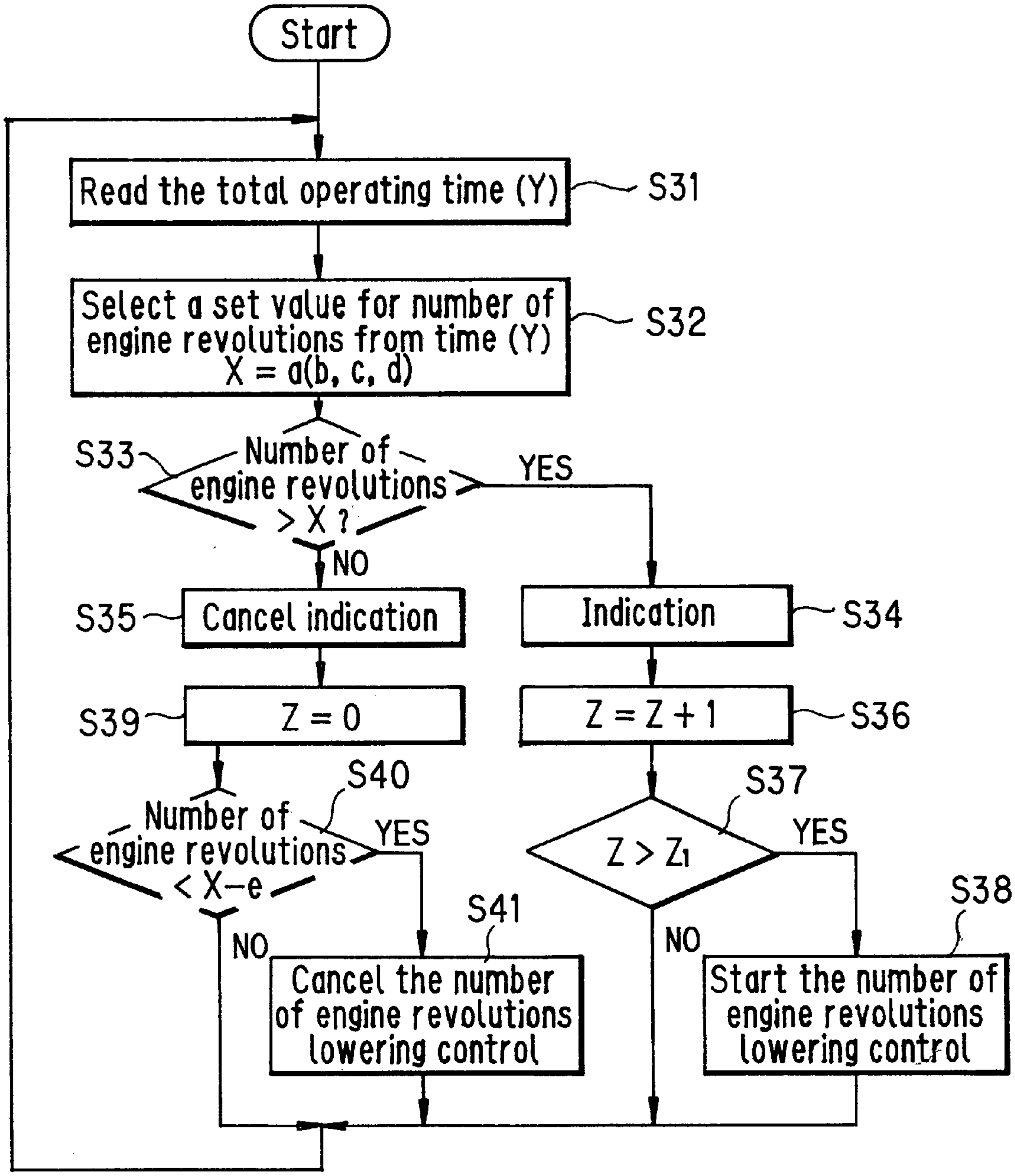
FIG. 8 is a flowchart for illustrating the control of the running-in process.

In the management control of embodiment 3, as shown in the flowchart in FIG. 8, variable Z is set into 0 (Z=0) when the operation is started. First, the total operating time (Y) at present is read out (S31) so as to select the set value X (X=a, b, c or d (see FIG. 7)) for number of engine revolutions in order to perform indication and the number of engine revolutions lowering control (S32). If the number of engine revolutions is greater than the set value X (S33:yes), an indication (lamp, LCD, etc.) indicates that the number of engine revolutions exceeds the recommended number of engine revolutions (S34). On the other hand, if the number of engine revolutions is equal to or lower than the set value (S33: no), the indication is cancelled (S35).

If the number of engine revolutions exceeds the set value, variable Z is incremented by 1 (i.e., Z=Z+1) (S36). When Z has become greater than Z1 (Z>Z1) after the number of engine revolutions was judged to exceed the set value in succession, the number of engine revolutions lowering control is performed (S37 to S38).

When the speed is lower than the set value, variable Z is initialized into zero (Z=0) (S39). When the number of engine revolutions becomes lower by 'e' than the set value X for number of engine revolutions lowering control, the system judges that the pilot has recognized the number of engine revolutions lowering control and returned the throttle, and cancels the lowering control (S40 and S41).

In embodiment 3 above, the control based on the upper limit of the recommended number of engine revolutions was described, but a similar control can be performed based on the upper limit of the recommended load (the load calculated from the degree of the throttle opening, boost pressure, intake air amount, etc.).

The preferred examples of the invention have been illustrated in the description of the above embodiments, but the present invention should not be limited to these. For example, the engines applied to the invention include those for water-surface boats as well as under-water boats.

As has been described, in accordance with the first feature of the invention, since the operating time when a warning about the engine occurred and the operating time when the warning was cancelled are stored in memory, it is possible to estimate the user's action and the duration of the warning from the time of occurrence of the warning and the time of the end of the warning. Accordingly, the judgment of the presence of damage to the engine can be made easily and the handling (repair, replacement, etc.) can be simplified.

In accordance with the second feature of the invention, since the various pieces of information about the engine are stored at the occurrence of a warning or from the occurrence of a warning to the end of the warning, from the diverse information about the engine during the occurrence of a warning, the judgment of the presence of damage to the engine can be made easily and the handling (repair, replacement, etc.) can be simplified.

In accordance with the third feature of the invention, since the operating time when a warning about the engine occurred, the operating time when the warning is cancelled, and the various pieces of information about the engine at the occurrence of the warning or from the occurrence of the warning to the end of the warning are stored in memory, it is possible to estimate the user's action and the duration of the warning from the time of occurrence of the warning and the time of the end of the warning. Further, from the diverse information about the engine during the occurrence of a warning, the judgment of the presence of damage to the engine and the handling (repair, replacement, etc.) can be improved.

In accordance with the fourth feature of the invention, since the numbers of occurrences of various warnings are stored in memory, it is possible to offer advice about the way of manipulating the boat, propeller matching, maintenance etc., if the engine has had certain kinds of warnings many times.

In accordance with the fifth feature of the invention, since various information can be transferred to a display device through communication network so that the stored pieces of information can be displayed on the display device, this configuration provides for simplifying the layout of the management unit and the display device, in addition to the operation and effectiveness of the above first through fourth features.

In accordance with the sixth feature of the invention, since the system has a means for storing the operating time classified according to number of engine revolutions and/or engine load, and manages the engine based on the stored time, the timing of maintenance and replacement of consumable parts, which were difficult to manage can be known and hence can be performed easily and without any cost.

In accordance with the seventh feature of the invention, the system includes a storing means whereby the operating time to be stored is given a weight according to the predetermined running condition of the engine, and the operating time is summed up separately based on the number of engine revolutions and based on the engine load so that the summations are stored. In this system, when the stored operating time reaches a set value, the corresponding management item (such as the timing of maintenance, the timing of replacement of consumable and/or degraded parts) is indicated (by lighting of a lamp, buzzer sound, LCD display etc.). Thus, since the exhaustion and degradation not only depends on the time of operation but also depends on the number of engine revolutions, load and temperature, this configuration of giving weights enhance the precision of the timing of replacement.

In accordance with the eighth feature of the invention, when either the time obtained by giving weights to the operating time classified according to number of engine revolutions and engine load, or the engine's use time (including the time of being left other than the operating time), first reaches the set value, the predetermined management item (the timing of replacement) is indicated. Thus, the timing of replacement can be changed taking into account not only the operating time but also the time of being left. As a result, this configuration provides enhancement of the precision of the timing of replacement in addition to the above operation and effects of the seventh configuration.

In accordance with the ninth feature of the invention, concerning management items of which the interval for maintenance or replacement varies depending upon the total operating time, the set value is switched based on the total operating time. Accordingly, it is possible to vary the timing of replacement of items, of which the interval for replacement varies, such as engine oil etc., based on the total operating time. Because, for example, engine oil needs to be changed after a shorter interval, for the first time. Thus, this configuration provides the above effect in addition to the above operation and effects of the seventh or eighth configuration.

In accordance with the tenth feature of the invention, the system, includes: a means wherein upper limits of the recommended number of engine revolutions or upper limits of the recommended load are preset for the running-in process based on the total operating time, or based on a distance-related value and whereby the number of engine revolutions or load is judged to exceed the upper limit; and a means for performing the predetermined indication (with a lamp or buzzer) when the upper limit is exceeded. As a result, the running-in process of the engine, which was difficult to mange, can be simply and exactly effected without any cost, thus making it possible to improve the durability of the product.

In accordance with the eleventh feature of the invention, the system having the above tenth feature, further includes a control means for lowering the number of engine revolutions when the engine continues to be run for more than a certain period of time with the speed or load exceeding the predetermined value. Therefore, in addition to the action and effect of the above tenth configuration, this control means can gradually lower the number of engine revolutions by performing the ignition cutting, controlling the phase lag and/or injection.

In accordance with the twelfth feature of the invention, in the system having the above eleventh, when the engine has continued to run at an number of engine revolutions lower than the predetermined rate for canceling the number of engine revolutions lowering control, to thereby meet the predetermined condition, for example, when the engine is has been run for a time longer the set time, the system judges that the operator has recognized the running-in process and returned the throttle, and cancels the number of engine revolutions lowering control.

What is claimed is:

1. A method for providing a predetermined management item relating to an engine, comprising the steps of:

storing a weighted operating time for each of a plurality of running conditions of said engine, said weighted operating times being a product of a respective predetermined weighting coefficient and a respective operating time;

summing said weighting operating times to produce a total weighted operating time; and indicating a corresponding predetermined management item when said total weighting operating time reaches a predetermined value.

2. The method according to claim 1, wherein the running condition includes the number of revolutions of said engine.

3. The method according to claim 1, wherein the running condition of said engine includes one or more of the following: the number of engine revolutions, the throttle opening of said engine and the operating temperature of said engine.

4. The method according to claim 1, wherein the predetermined management item is indicated if a total non-weighted operating reaches said predetermined value before said total weighted operating time.

5. The method according to claim 1, wherein said predetermined value for said predetermined management item varies depending upon the total weighted operating time of said engine.

6. The method according to claim 4, wherein said predetermined value for said predetermined management item varies depending upon the total weighted operating time of said engine.

7. A system for providing a predetermined management item relating to an engine comprising:

means for storing a weighted operating time for each of a plurality of running conditions of said engine, said weighted operating times being a product of a respective predetermined weighting coefficient and a respective operating time;

means for summing said weighting operating times to produce a total weighted operating time; and means for indicating a corresponding predetermined management item when said total weighting operating time reaches a predetermined value.

8. The means according to claim 7, wherein the running condition includes the number of revolutions of said engine.

9. The means according to claim 7, wherein the running condition of said engine includes one or more of the following: the number of engine revolutions, the throttle opening of said engine and the operating temperature of said engine.

10. The means according to claim 7, wherein the predetermined management item is indicated if a total non-weighted operating reaches said predetermined value before said total weighted operating time.

11. The means according to claim 7, wherein said predetermined value for said predetermined management item varies depending upon the total weighted operating time of said engine.

12. The means according to claim 10, wherein said predetermined value for said predetermined management item varies depending upon the total weighted operating time of said engine.

13. An engine management system for an engine, comprising:

means for storing data relating to said engine wherein an upper limit of a recommended number of engine revolutions or an upper limit of a recommended load are preset in said means for storing for a running-in process of said engine based on a total operating time of said engine, or based on a distance-related value of said engine and whereby the number of engine revolutions or load of said engine is judged to exceed said upper limit;

means for performing a predetermined indication when said upper limit is exceeded; and control means for lowering the number of engine revolutions when the engine continues to be run for more than a certain period of time with a speed or load exceeding a predetermined value.

14. The engine management system according to claim 13, farther including means for canceling said control means for lowering when the engine has continued to run at a number of engine revolutions lower than a predetermined rate.

* * * * *